(12) United States Patent
Kornmayer

(10) Patent No.: US 7,158,375 B2
(45) Date of Patent: Jan. 2, 2007

(54) PORTABLE COMPUTER SYSTEM

(75) Inventor: Ingbert Kornmayer, Augsburg (DE)

(73) Assignee: Fujitsu Siemens Computers GmbH, Munich (DE)

( * ) Notice: Subject to any disclaimer, the term of this patent is extended or adjusted under 35 U.S.C. 154(b) by 295 days.

(21) Appl. No.: 10/204,438

(22) PCT Filed: Mar. 1, 2001

(86) PCT No.: PCT/DE01/00774

§ 371 (c)(1),
(2), (4) Date: Aug. 30, 2002

(87) PCT Pub. No.: WO01/71465

PCT Pub. Date: Sep. 27, 2001

(65) Prior Publication Data

US 2003/0157389 A1    Aug. 21, 2003

(30) Foreign Application Priority Data

Mar. 21, 2000    (DE) ................................ 100 13 862

(51) Int. Cl.
G06F 1/16      (2006.01)
H01M 8/04    (2006.01)
(52) U.S. Cl. ........................... 361/683; 429/26; 429/34
(58) Field of Classification Search ...................... None
See application file for complete search history.

(56) References Cited

U.S. PATENT DOCUMENTS 5,932,365 A    8/1999  Lin et al.
6,057,051 A *  5/2000  Uchida et al. ................. 429/19
6,326,097 B1* 12/2001  Hockaday ...................... 429/34
6,447,945 B1*  9/2002  Streckert et al. ............... 429/34

FOREIGN PATENT DOCUMENTS

| EP | 0788 172 A1 | 8/1997 |
| JP | 8288681 | 11/1996 |
| JP | 9-213359 | 8/1997 |
| JP | 10064567 | 3/1998 |
| JP | 11340671 | 12/1999 |
| KR | 1998-24053 | 7/1998 |
| KR | 2000-191762 | 5/2000 |
| WO | WO 99/33124 | 7/1999 |
| WO | PCT/US99/29350 | 6/2000 |

* cited by examiner

Primary Examiner—John S. Maples
(74) Attorney, Agent, or Firm—Cohen, Pontani, Lieberman & Pavane

(57) ABSTRACT

Due to the limited capacity of secondary batteries, the operating period of notebooks is short. A fuel cell (22) in connection with a hydride storage unit allows for significantly longer periods of operation. The arrangement of the fuel cell (22) within a display unit (2) allows for the flexible use of the traditionally two module installation bays (11, 12) of the main unit (1) of a portable computer system. Even if one of the module installation bays is occupied by one of the insertable hydride storage tanks in the form of a module, another module installation bay (12) is available to the user for insertion of drives, such as CD-ROM. The flat arrangement of the fuel cell (22) in the display unit (2) folded open into a vertical position ensures a high efficiency of the fuel cell (22).

11 Claims, 2 Drawing Sheets

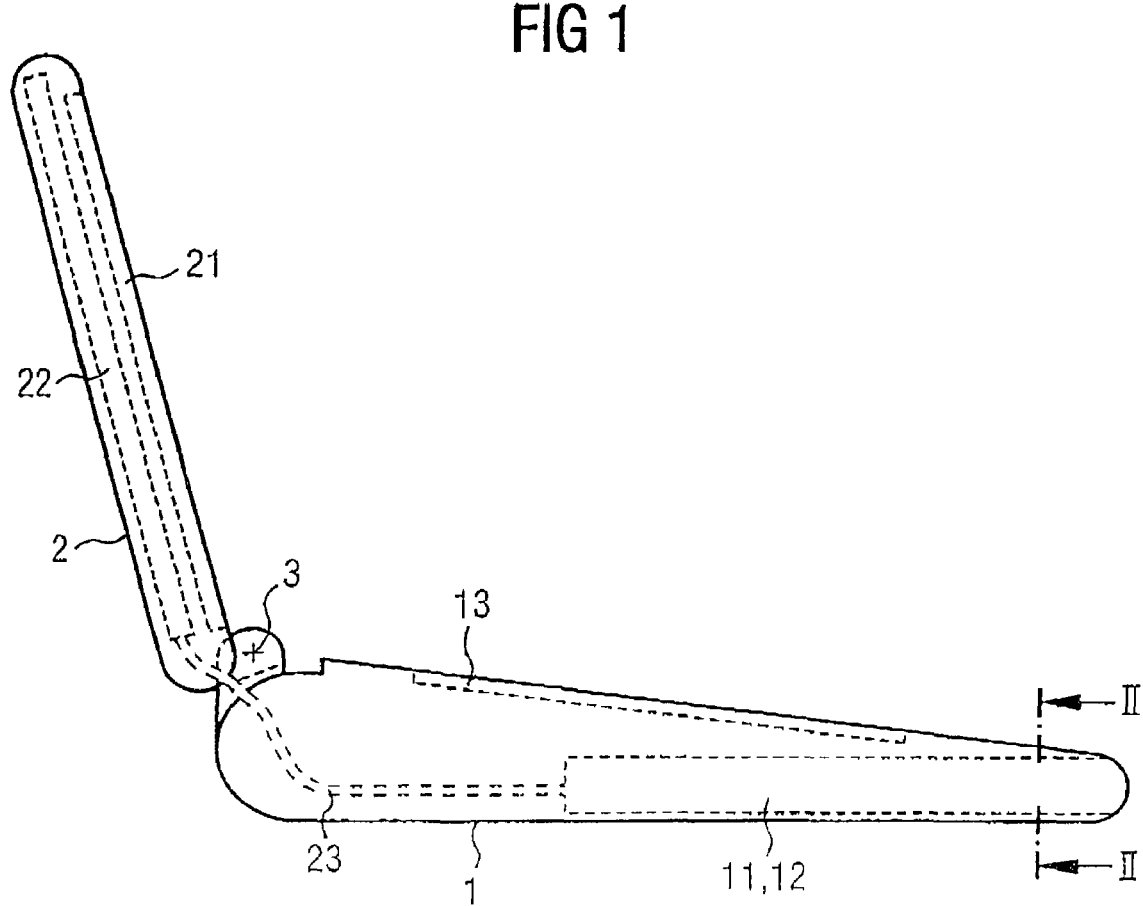
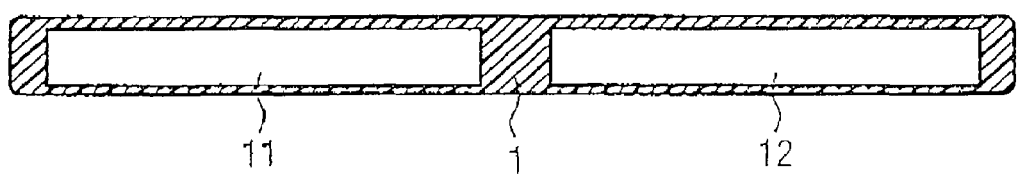

PORTABLE COMPUTER SYSTEM

RELATED APPLICATIONS

This is a U.S. National Phase Application under 35 USC 371 of International Application PCT/DE01/00774, filed on 1 Mar. 2001.

BACKGROUND OF THE INVENTION

The invention pertains to a portable computer system (notebook).

Portable computer systems are widely known. Portable computer systems consist of a basically rectangular main unit as well as a swivel-mounted display unit that is attached to the main unit. On its upper side, the main unit houses a keyboard for data entry. The display unit, which is basically rectangular, contains a flat screen, such as a TFT display, on the side facing the main unit. Portable computer systems are inasmuch integrated as they usually contain data entry equipment (keyboard, mouse), display equipment (monitor, display), computing unit, permanent and temporary memories, which are integrated into one device.

In order to supply energy for a portable computer system, batteries or accumulators are provided in addition to the option of using an external electricity source with a mains plug.

There are two different kinds of batteries or accumulators: primary batteries are not rechargeable, and therefore the use of them is uneconomical, cost-intensive and hard on the environment. Secondary batteries can be recharged with the help of a charging device, however, since their capacity is limited, operation independent from an external power source is only possible for approximately two to four hours. Secondary batteries are known for example as nickel-cadmium (NiCd), nickel-metallic-hydride (NiMH), or lithium-ion (LiIon) batteries. The short periods of operation in particular, which secondary batteries can provide per charge cycle, have led to the search for alternative concepts of energy supply.

Portable computer systems (notebooks) usually contain two module installation bays. Modules can be inserted into these module installation bays. These modules contain either secondary battery packs or additional peripheral devices such as CD-ROM drive, disc drive, additional hard drives, etc. The user is thus offered the greatest possible flexibility.

The printed document U.S. Pat. No. 5,932,365 mentions a fuel cell for the production of electrical energy, as suitable for a notebook or a portable telephone. Hydrogen stored in a tank reacts with oxygen from the air in an electrochemical reaction during which electrical energy is released.

In order to equip a portable computer system for electrical power supply by means of a fuel cell, the fuel cell itself as well as a gas storage tank have to either be accomodated within or arranged externally on the computer system. Currently, both module installation bays are being used for this purpose; namely one module installation bay for the gas container and the other module installation bay for the fuel cell. The gas tank can house hydrogen for example in solid form in a hydride storage tank. This arrangement has the disadvantage that it compromises the flexibility strived for by the module principle. Another conceivable external arrangement of at least the gas tank or the fuel cell is also unwieldy.

SUMMARY OF THE INVENTION

The task at the heart of this invention is the creation of a portable computer system with improved space efficiency regarding energy supply from a fuel cell.

According to the invention, this task is accomplished by a portable computer system with a main unit and a display unit, in which the display unit contains a fuel cell, the main unit contains a gas storage tank, and the fuel cell is connected to the gas storage tank.

A portable computer system contains a main unit, on the upper side of which a keyboard for example may be located for data entry; as well as a display unit, which makes an optical data output possible by means of an optical display. The display unit contains a fuel cell within which an electrochemical reaction can produce electrical energy for the power supply of the portable computer system. In order to produce electricity in a fuel cell, hydrogen gas for example can be made to react with oxygen gas. The main unit of the portable computer system contains a gas storage tank, within which hydrogen gas for example can be stored. The hydrogen does not necessarily have to be stored in its gaseous state of aggregation. If the fuel cell is intended for a reaction of hydrogen and oxygen, the oxygen can be supplied from the surrounding air. There is a connection between the gas storage tank and the fuel cell. The substance stored in the gas storage tank is fed to the fuel cell through this connection. The described arrangement offers a spacial separation of the fuel cell and the gas storage tank. Since the fuel cell is not located in the main unit, better and more flexible use of the available space is possible in the main unit.

Other suitable substances, such as methanol, may be used as an alternative for hydrogen as fuel for the fuel cell.

For the purpose of adjusting or increasing the voltage, the fuel cell can be built from several individual cells.

The storage of hydrogen in the gas storage tank can be reversible, so that the gas storage tank is rechargeable.

In order to charge the gas storage tank, it is conceivable to use a charging device, in which electricity, which is produced in solar cells operating on photovoltage, uses electrolysis to split up water into hydrogen and oxygen. The described arrangement is energetically completely self-sufficient and makes a practically unlimited period of use or operation possible.

In an advantageous model of the invention in question, the gas storage tank is arranged in a module, which can be inserted into a module installation bay in the main unit. This makes it possible to remove the gas storage tank from the portable computer system for the purpose of loading or recharging it, and to replace it with a charged gas storage tank. This prolongs the operating time, which already is markedly longer with fuel cells, without having to recharge the gas storage tank at a charging station. By adhering to the module concept, which is widely used with secondary batteries, only minor adjustments in the use of space or the production process of the computer system are required. Adherence to the module concept, for instance with two module installation bays in a portable computer system, also allows for user ergonomics to be maintained or improved, since CD-Rom, disc, or hard drive inserts can be used.

In another advantageous model of the invention in question, the fuel cell is layed out over a wide area and is arranged parallel to a flat optical display in the display unit. The flat layout of the display units is retained by the likewise flat fuel cell which is layed out over a wide area and parallel to the optical display or monitor. Such an optical display could for instance be a LCD or TFT display. The layout of the fuel cell over a wide area renders the production of electrical energy very efficient. Since display units in the operating mode usually are in a basically vertical position in space, the exchange or the dissipation of heat is additionally improved by the natural convection in the air. This further improves the efficiency.

In another advantageous model of the invention in question, the display unit is swivel-mounted onto the main unit. The display unit can thus be placed upright in the operating mode, and the computer system can be folded flat for transport purposes.

In another advantageous model of the invention in question, the gas storage tank is a hydride storage tank, in which hydrogen can be stored in a reversible manner.

In another advantageous model of the invention in question, a thermally isolating layer is arranged between the fuel cell and the optical display in order to keep heat generated in the fuel cell away from the optical display.

In order to improve the exchange of heat, the display unit can be equipped with cooling ribs. The casing of the display unit, in which the fuel cell may be integrated, may show openings in order to supply the fuel cell with oxygen, which then can be made to react with hydrogen.

Additional vents on the casing of the display unit can be provided in order to improve the oxygen supply.

The connection between the gas storage tank and the fuel cell or between the main unit and the swivel-mounted display unit may at least partially run through the axis of swivel.

Further details of the invention are outlined in the subclaims.

BRIEF DESCRIPTION OF THE DRAWINGS

The invention will now be explained further based on one model as an example with the help of the drawings.

Showing as follows:

FIG. 1 A portable computer system with display unit folded open in a side view.

FIG. 2 The main unit of a computer system in a cross sectional view.

DETAILED DESCRIPTION OF THE DRAWINGS

Figure 3:
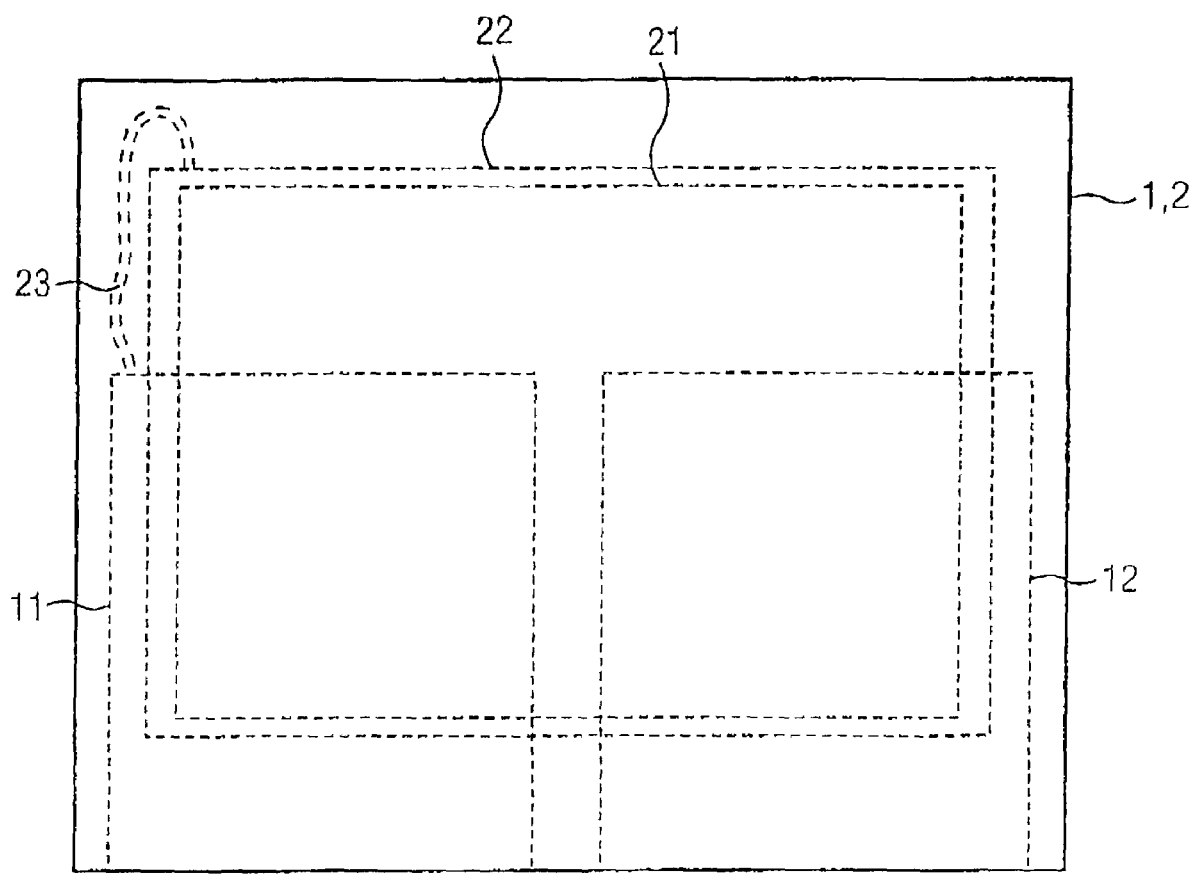
FIG. 3 A birds-eye view of the computer system in a folded up state.

FIG. 1 shows a portable computer system with a main unit 1 and a display unit 2. These are connected by a lengthwise edge in a swivelling manner. With regards to the main unit 1, the display unit 2 swivels around an axis 3. For transport purposes, the display unit can be folded down, whereas it is folded up during the operating mode. In addition to an input keyboard 13, the main unit possesses two module installation bays 11, 12. One of the two module installation bays 11 is connected to the fuel cell 22 in the display unit 2 via a flexible, gastight connection 23. This fuel cell 22 is arranged behind the optical display 21 from the user's point of view. Necessary components of a computer system such as mother-board (main board), graphics card, hard drive, temporary memory (RAM), processor (CPU, Central Processing Unit), etc. as well as their connectors are not shown in the drawing.

FIG. 2 shows the main unit according to FIG. 1 in a cross sectional view. The described computer system has two module installation bays 11, 12, into which insertable modules can be placed from the side facing the user.

FIG. 3 shows the portable computer system with the display unit folded over the main unit 1. The outlines of the optical display 21 and the likewise widely layed out fuel cell 22 are visible. The latter is connected with a module installation bay 11 via a gastight, flexible connection 23, or could be connected to a gas tank module, which can be inserted into the module unit. In addition to this, the main unit shows a second module installation bay 12.

Both module installation bays 11, 12 are shown in FIG. 3 with the same dimensions, however it is conceivable that the module installation bays could have different dimensions for different types of modules. For example, batterie modules or gas storage tank modules could have different dimensions than hard drive modules, CD-ROM modules or disc drive modules.

In comparison with traditional secondary batteries, the use of a fuel cell 22 in connection with a gas storage tank allows for a markedly longer operating time between two charging cycles. Compared to nickel-cadmium, nickel-metal-hydride ore lithium-ion secondary batteries, which allow for operating periods of merely two to four hours between two charging cycles, operation independent from external power supply of approximately one week can be realized with the described arrangement.

The arrangement of the fuel cell 22 inside of the display unit 2 makes at least one module installation bay 12 available for the insertion of other modules such as CD-ROM drives. This offers greatest possible flexibility to the user. If the gas storage tank is designed as a module that can be inserted into a module installation bay 11, one energy storage unit can be recharged while the other one is inserted into the module installation bay in order to supply energy to the computer, as is a well-known concept with secondary batteries.

If the gas storage module has the same dimensions as a traditional secondary battery pack, the portable computer system can be used with traditional accumulators as well as with a fuel cell and gas storage tank. This of course requires a gastight, separable coupling between the gastight connection 23 and the gas storage module.

Arranging the fuel cell 22 over a wide area within the display unit 2 makes the energy transformation within the fuel cell very efficient, since a large area facilitates heat release. Since the display unit 2 is in a basically vertical position during operation, the natural convection of the surrounding area further improves the efficiency of the fuel cell.

If the fuel cell 22 is arranged in a particularly flat manner behind the display 21, the dimensions of the latter, especially the thickness of display unit 2, will only be slightly increased. The described arrangement with gas storage tank and fuel cell requires only minor changes to a standard computer system and can therefore be realized easily and at low cost.

Since the possible operating time of the computer system depends on the efficiency of the fuel cell 22, the energy requirements of the computer system, as well as the amount of storable hydrogen, the operating period can be prolonged by means of an improved hydrogen bond within a gas storage tank, which could for example be a hydride storage tank.

The described arrangement is not limited to the use of hydrogen and oxygen in a fuel cell. The use of methanol, for instance, is conceivable as an alternative for hydrogen.

The described arrangement is designed for a portable computer system. However, the principle in question can be transferred to other portable electronic systems, such as organizers. These also possess a main unit and a display unit, which can be swivel-mounted to the main unit.

The invention claimed is:

1. A portable computer system comprising:
   a main unit;
   a display unit coupled to said main unit;
   a fuel cell, said fuel cell being contained in said display unit;
   a gas storage tank, said gas storage tank being contained in said main unit; and
   a gastight and flexible connection between said fuel cell and said gas storage tank.

2. The portable computer system according to claim 1, further comprising a module installation bay accommodating the gas storage tank therein.

3. The portable computer system according to claim 1, wherein the fuel cell has a large area and is arranged parallel to a flat optical display in the display unit.

4. The portable computer system according to claim 1, wherein the display unit is connected to the main unit so as to swivel around a pivot axis.

5. The portable computer system according to claim 1, wherein the gas storage tank is a hydride storage tank.

6. The portable computer system according to claim 1, further comprising a thermally insulating layer arranged between an optical display in the display unit and the fuel cell.

7. The portable computer system according to claim 1, further comprising:
   cooling ribs, which are arranged on a side of the display unit which faces away from an optical display in the display unit, and which are thermally connected to the fuel cell.

8. The portable computer system according to claim 1, wherein the display unit has a casing with openings that are connected to the fuel cell which is arranged within the casing.

9. The portable computer system according to claim 8, further comprising vents in the display unit.

10. The portable computer system according to claim 4, wherein the connection between the fuel cell and the gas storage tank runs at least partially on said pivot axis.

11. The portable computer system according to claim 1, further comprising a separable coupling disposed between said connection and said gas storage tank.

* * * * *